United States Patent
Goldin et al.

(10) Patent No.: US 11,445,793 B1
(45) Date of Patent: Sep. 20, 2022

(54) HINGED CLEANING COMB (71) Applicants: Jonathan Goldin, Tel aviv (IL); Javier Goldin, Yecla (ES)

(72) Inventors: Jonathan Goldin, Tel aviv (IL); Javier Goldin, Yecla (ES)

(*) Notice: Subject to any disclaimer, the term of this patent is extended or adjusted under 35 U.S.C. 154(b) by 500 days.

(21) Appl. No.: 15/444,100

(22) Filed: Feb. 27, 2017

Related U.S. Application Data (60) Provisional application No. 62/299,586, filed on Feb. 25, 2016.

(51) Int. Cl.
*A45D 24/06* (2006.01)
*A45D 24/30* (2006.01)
*A45D 24/04* (2006.01)
*A01K 13/00* (2006.01)

(52) U.S. Cl.
CPC ............ *A45D 24/30* (2013.01); *A45D 24/04* (2013.01); *A01K 13/002* (2013.01)

(58) Field of Classification Search
CPC ... A45D 8/24; A45D 8/30; A45D 8/20; A45D 24/04; A45D 24/30; A45D 24/34; A01K 13/002; F16B 2/005; F16B 2/02; F16B 2/06; F16B 2/10
See application file for complete search history.

(56) References Cited

U.S. PATENT DOCUMENTS

| 2,241,879 | A | * | 5/1941 | Foster, Jr. | A45D 24/04 132/135 |
|---|---|---|---|---|---|
| 2,430,303 | A | | 11/1947 | Ruhl | |
| D206,476 | S | | 12/1966 | Cournoyer | |
| 4,414,992 | A | * | 11/1983 | Russell | A45D 2/00 132/129 |
| 4,440,180 | A | * | 4/1984 | Thomas | A45D 2/00 132/129 |
| 4,502,498 | A | | 3/1985 | Saferstein | |
| 4,536,924 | A | * | 8/1985 | Willoughby | A44B 99/00 24/487 |
| 4,612,944 | A | | 9/1986 | Bachrach | |
| D289,567 | S | | 4/1987 | O'Connor | |
| 4,671,303 | A | | 6/1987 | Saferstein | |
| 4,763,675 | A | | 8/1988 | DeFelice | |
| D307,192 | S | | 4/1990 | Saferstein | |
| D332,505 | S | | 1/1993 | Ward | |
| D353,915 | S | | 12/1994 | Lanne | |
| 6,691,713 | B1 | | 2/2004 | Altschuler | |
| 7,992,579 | B2 | * | 8/2011 | Longoria | A45D 8/20 132/279 |
| 8,511,321 | B2 | | 8/2013 | Sanz | |
| 9,072,355 | B1 | * | 7/2015 | Magnani | A45D 8/20 |
| 2008/0283075 | A1 | * | 11/2008 | Vance | A45D 24/04 132/200 |
| 2010/0147321 | A1 | * | 6/2010 | Colletts | A45D 24/04 132/213.1 |
| 2014/0366908 | A1 | * | 12/2014 | Shevlin | A45D 24/04 132/210 |
| 2019/0098981 | A1 | * | 4/2019 | Matossian | A45D 24/36 |

* cited by examiner

Primary Examiner — Rachel R Steitz (57) ABSTRACT

A device and method is provided for the removal of foreign elements and smaller particles from hair and scalp. The device has two sets of parallel interleaving teeth where adjacent teeth can be separated to allow easy removal of foreign matter trapped between the teeth, effectively reducing the time required to perform the cleaning action.

22 Claims, 11 Drawing Sheets

HINGED CLEANING COMB

BACKGROUND OF THE INVENTION

Field of Invention

The present invention relates to a cleaning device for hair and scalp, and more particularly to a new cleaning comb with the means to separate adjacent teeth for easy removal of the captured matter.

Description of the Related Art

The extraction of foreign particles from hair and scalp is an ongoing struggle. Dandruff, lice, nits, saw dust, fleas, ticks and sand are just a few of many particles that can remain in the hair and scalp, after a regular hair wash and that are too small to be removed with a regular comb.

The prior art has taught a variety of combs that remove hair and scalp attached particles, particularly lice and nit removing combs. Different teeth sizes, shapes and roughness patterns, with varying degrees of effectiveness, are also known in the art.

One problem that has not been properly addressed in the art has been the difficulty of removing the foreign particles trapped in-between the tightly positioned teeth of an apparatus designed especially for trapping said particles. After each swipe of the comb through the patient's hair, the extracted particles must be removed from the comb in order to avoid recontamination of the patient. To accomplish this, users of current combs need to split the comb's teeth with their fingers under running water, dip the comb in a bowl with water and wipe it with a paper towel or clean it by some other time consuming and ineffective method, after each swipe. The better the comb is in trapping the foreign particles, the better it cleans, however, such good combs are also harder to clean of trapped matter and longer time is required to clean the comb.

It is estimated that more than 80% of the time involved in the process of cleaning the hair is spent cleaning the comb from the trapped particles.

It is not uncommon for some distributors of such combs to include a small brush to clean the comb. While the use of such small brushes make the cleaning easier, it still requires the user to grab another tool, it is still time consuming and the brushes are not very efficient cleaning the comb.

It is an unfortunate but all too common occurrence when care givers must struggle with children in order to go through a lengthy lice cleaning session.

Accordingly, there exist a need for an apparatus that is effective in the removing of small particles from hair and scalp that can also be efficiently cleaned of such captured matter requiring minimum effort and time.

SUMMARY OF THE INVENTION

The present invention includes an apparatus and method for the removal of small particles from hair and scalp that can also be efficiently cleaned from such captured matter.

The comb consists of two body members, each with a series of teeth, the teeth being parallel to the other teeth in the same series, with the teeth in each series positioned at an equidistance.

Both body members are connected and pivotally coupled together via a hinge means that allows them to pivot to either an open or a closed position. By actuating upon the opening levers together in order to create a gap between the two parallel series of teeth, the adjacent teeth are separated allowing an easy release of trapped matter, overcoming the shortcoming and disadvantages found in the art by providing a system that offers excellent small particles removal capabilities and that can be cleaned of such particles without the use of further tools, requiring minimum effort and effectively reducing the time required for the cleaning process.

Another advantage of the present invention is that the user does not need to touch the captured particles to clean the comb.

DETAILED DESCRIPTION OF THE INVENTION

FIGS. 1 through 6 show an embodiment of the apparatus of the present invention, wherein the apparatus includes two body members 11 and 13, each having a handle area 15 and 17 and series of teeth 19 and 21. The teeth in each of the series of teeth 19 and 21 are each positioned parallel to other teeth on its own specific body member 11 and 13. The teeth of the series 19 and 21 are elongated, each jutting out from their handle areas 15 and 17 in a first plane and second plane, respectively.

A hinge means 23 connects the first body member 11 to the second body member 13 allowing them to change their respective spacing from one another.

In one embodiment, the hinge means 23 connects the first and second body members 11 and 13 at their respective intermediate areas 25 and 27 situated in the handles 15 and 17 between two respective opening levers 29 and 31, and two respective holding areas 33 and 35.

Figure 1:
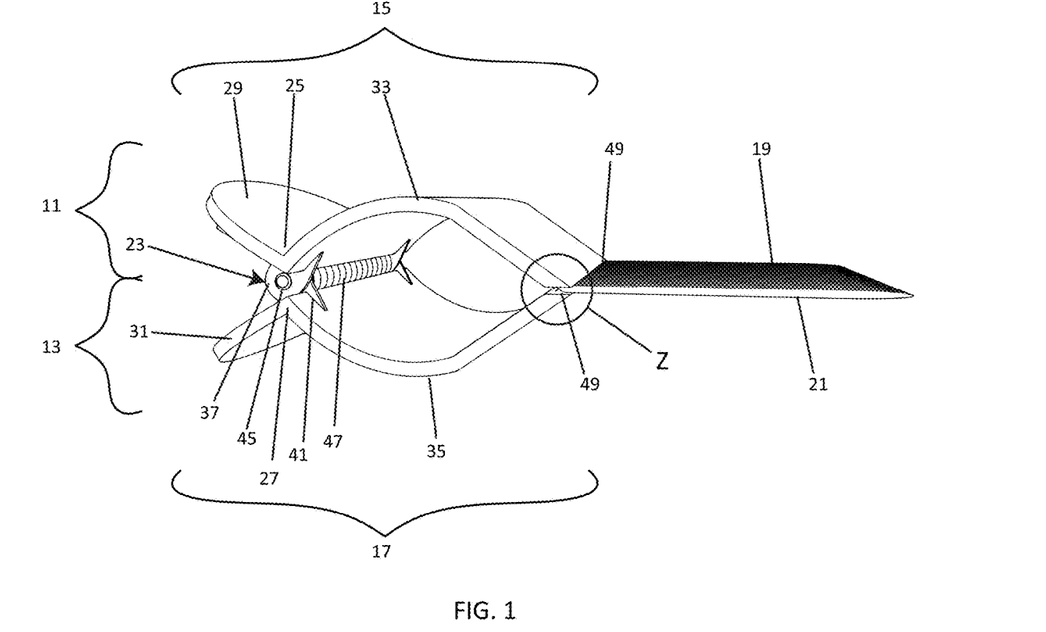
FIG. 1 is a side perspective view of one of the embodiments of this invention, wherein the apparatus is in the closed position.
Figure 2:
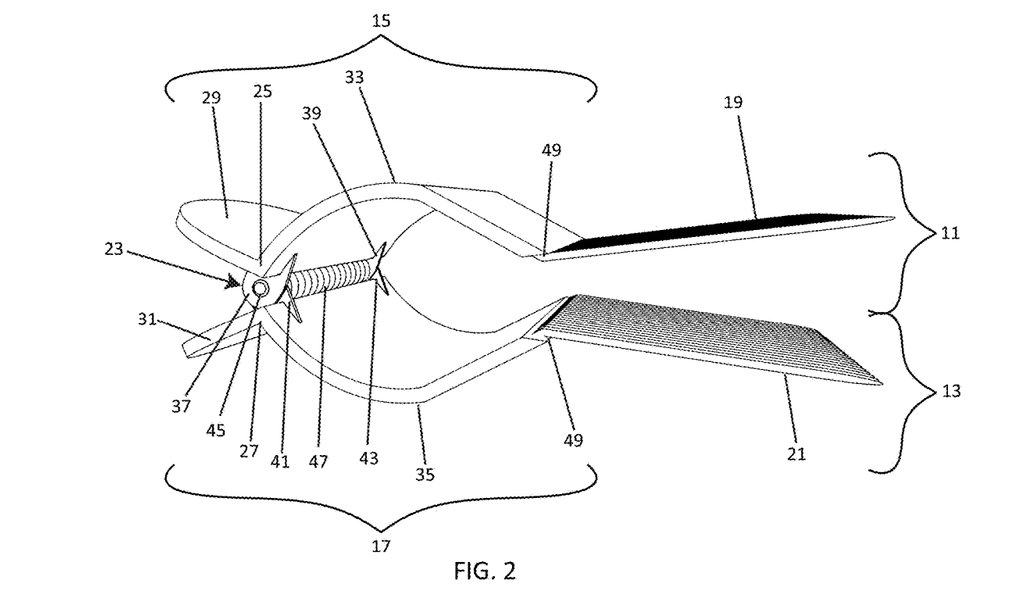
FIG. 2 is a side perspective view of the embodiment of FIG. 1 wherein the apparatus is in the open position.
Figure 3:
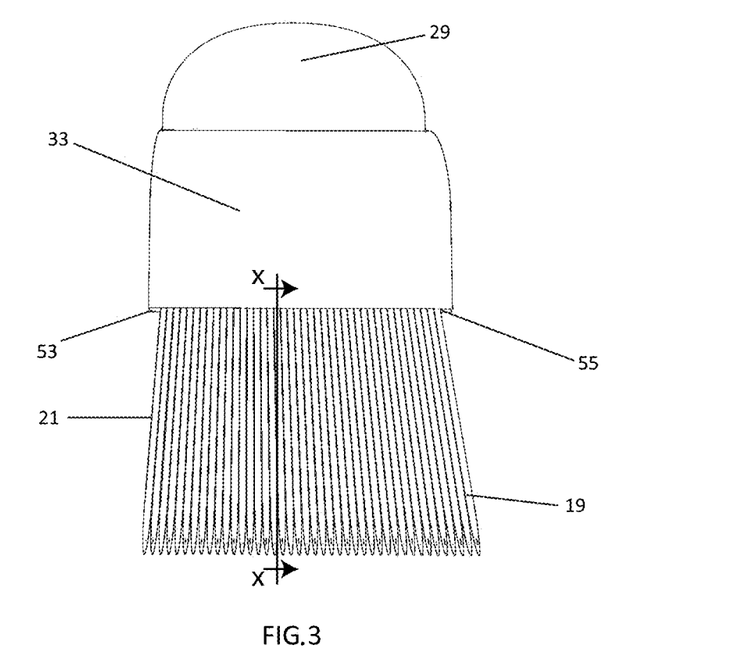
FIG. 3 is a top perspective view of the embodiment of FIG. 1 wherein the apparatus is in the closed position.
Figure 4:
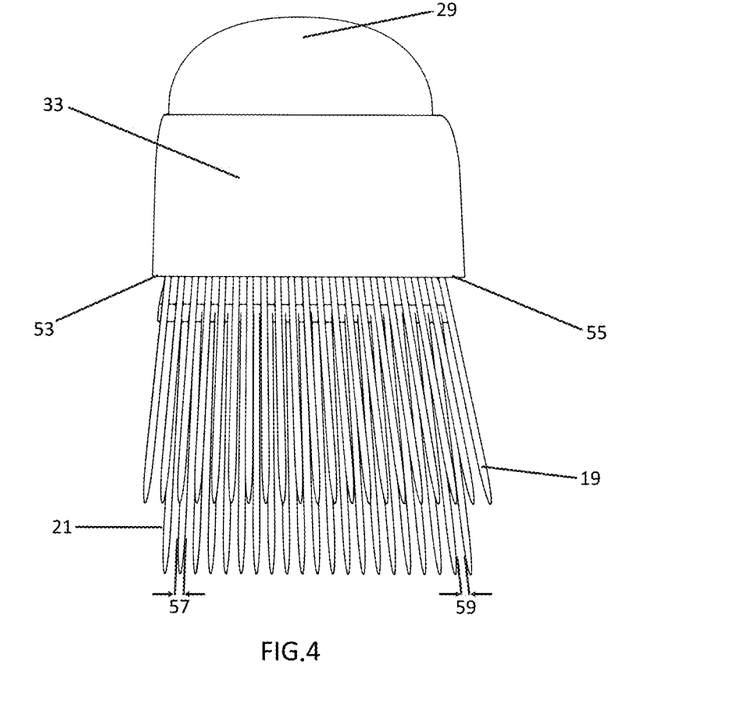
FIG. 4 is a top perspective view of the embodiment of FIG. 1 wherein the apparatus is in the open position.
Figure 7:
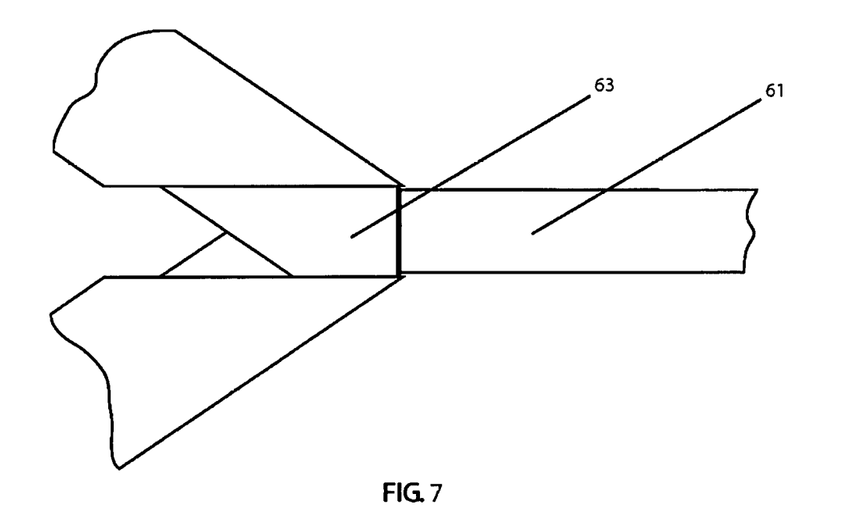
FIG. 7 is a close-up side view of the area Z in an embodiment of FIG. 1 wherein the teeth have a taper and the apparatus is in the closed position.

Hinge means 23 connects the body members 11 and 13 allowing them to pivot relative to each other about a hinge pin 45 which defines a hinge axis between an open position, as shown in FIGS. 2 and 4, in which the first series of teeth 19 and the second series of teeth 21 are rotated apart and a closed position, as shown in FIGS. 1,3 and 7, in which the two series of teeth 19 and 21 are in the same plane so that the first plane and the second plane are coplanar and interleaved with each other so that the first series of teeth 19 and the second series of teeth 21 form a single row of teeth in the plane. The hinge axis may also lie in the same plane.

In the embodiment shown in FIGS. 1-6, a hinge pin 45 passes through the perforations in the lugs 37 and 39 of the first member 11 and through the perforations in the lugs 41 and 43 of the second member 13 to connect the two body members. Thus, the hinge pin 45 and lugs 37, 39, 41 and 43 form the hinge means 23.

In an embodiment, wherein the handles 15 and 17 are made of molded polymer, the handles 15 and 17 and the lugs 37, 39, 41 and 43 can be made from one piece.

Elastic means 47, seen in FIGS. 1 and 2, urge the body members 11 and 13 to pivot relative to each other towards the apparatus' closed resting position as shown in FIGS. 1, 3 and 7.

In one embodiment, the elastic means 47 is provided by a conventional torsional spring wound in a helix about the hinge pin 45, whereby one of the ends of the spring bears on the lever 29 of the body member 11 and the other end bears on lever 31 of body member 13.

In yet a further embodiment, the spring can take on other characteristics, for example being made of round wire, square wire, rectangular wire, being closed coiled, being made of ferrous metal, being made of non-ferrous metal, being made of austenitic stainless, having a configuration selected from the group consisting of helical compression, helical extension, torsion bars, helical torsion, spiral springs, flat springs, etc.

Within the series of teeth 19 and 21, each tooth has a length of from about 20 mm to about 90 mm. As will be discussed later, the tooth consists of 3 subsections.

In one embodiment, the teeth comprising the teeth series 19 and 21 can be made of a metal, for example stainless steel, with a peripheral surface either smooth or rugged.

As will be further discussed, there is a bending point 49 located in the intermediate portion of each tooth.

FIG. 2 shows an embodiment of the apparatus of the present invention, whereby through the application of upward or downward force upon the levers 29 and 31, the series of teeth 19 and 21 are rotated away from each other so that the end portions are moved away from one another hence adopting the open position. The rotation is brought about by the hinge means 23.

Due to the apparatus of the present invention, notably the use of a bending point 49 in the intermediate portion of each tooth (better seen in FIGS. 6 and 7), complete separation of the opposing series of teeth 19 and 21 is achieved while the apparatus is in the open position.

The beneficial effects of complete separation is that any foreign matter trapped between teeth that were adjacent to each other while in the closed position can be dislodged easily and efficiently while in the open position.

FIG. 3 is a top perspective view of the apparatus while it is in the closed position, i.e., the series of teeth 19 and 21 are parallel, interleaved and in the same plane to one another with the end portions forming a straight row in that plane.

The apparatus further includes spaces 53 and 55 at either end of each series of teeth.

FIG. 4 shows a top perspective view of the apparatus in an open position, created through the actuation of the levers 29 and 31. Upon actuating from each other, the spacing between the teeth in each series 19 and 21 becomes apparent. In the closed position (FIG. 3), the gap between adjacent teeth significantly decreases because the teeth of the two series interleave with each other. The creation of the space between the teeth while in the open position allows the apparatus to be cleaned easily without significant handling.

Figure 5:
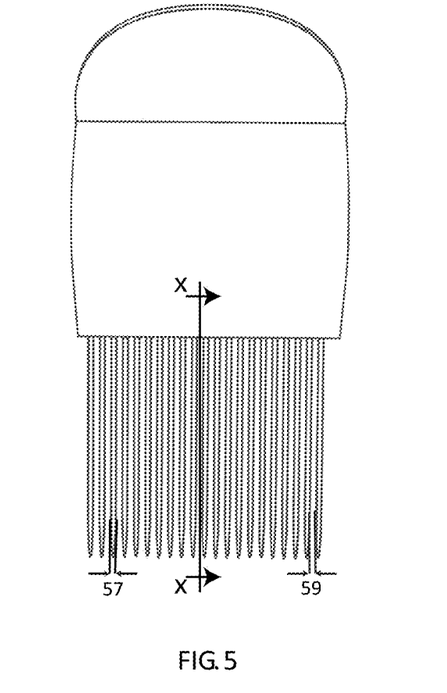
FIG. 5 is a top view of one body member of the embodiment shown in FIG. 1.

The spacing between the teeth of the same series 59 is presented in FIGS. 4 and 5, as well as the width of each tooth 57.

FIG. 5 shows a top view of one body member of this embodiment, wherein the apparatus shows one series of teeth and one handle of the apparatus corresponding to one body member.

In a preferred embodiment, the space between each tooth of the same series 59 is equivalent to the width of the tooth 57 plus 2 times the target gap. Wherein said target gap is defined as the desired gap between the active portions of adjacent teeth when the comb is in the closed position:

$$S_{tooth} = T_w + 2 * G_{ATC}$$

Where, $S_{tooth}$=Spacing between teeth on the same series of teeth
$T_w$=width of the tooth
$G_{ATC}$=target gap between the active portion of adjacent teeth when the apparatus is in the closed position Different target gaps can be used with this invention depending on the size of the particles the apparatus is designed to remove. For lice and nits this gap is usually between 50 µm to 150 µm. As an example, for ticks the target gap could be larger.

Figure 6:
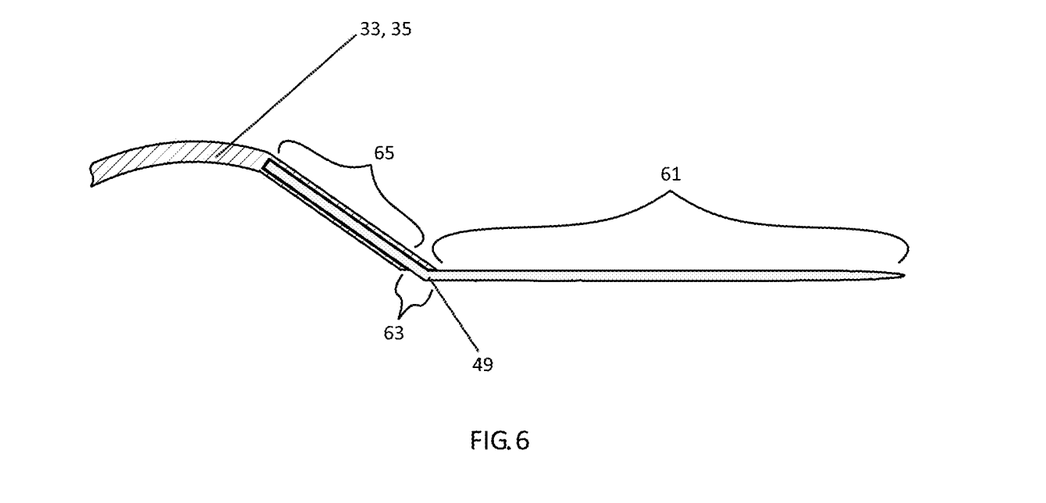
FIG. 6 is a partial section of the body member shown in FIG. 5 along the line XX shown in FIG. 5.

FIG. 6 (a partial section along the line XX shown in FIG. 5) and FIG. 7 (a close up side view of the area Z shown in FIG. 2) show an embodiment of a tooth used in one of the series of teeth of the apparatus, wherein each tooth used in the apparatus consists of 3 sub-portions. An active portion 61 is the portion that engages with hair and scalp for the purpose of combing and cleaning. The active portion 61 generally has a length of from about 20 mm to 60 mm and lies in the plane of the series of teeth. The tooth also consists of the intermediate portion 63, wherein this is the portion of the tooth that is outside the body members handles 33 and 35, but does not come into contact with the hair or scalp of the patient (whose hair is to be combed with the apparatus). The intermediate portion 63 generally has a length of from about 1 to 20 mm. The tooth also contains a fastening portion 65, which is the portion that enters the body member handle 33 and 35, and is affixed thereto.

In the embodiment shown, there is a bending point 49 located in the intermediate portion 63 of every tooth. This bend of the teeth allows for complete separation of the opposing series of teeth 19 and 21 while the comb is in its open position.

Figure 8:
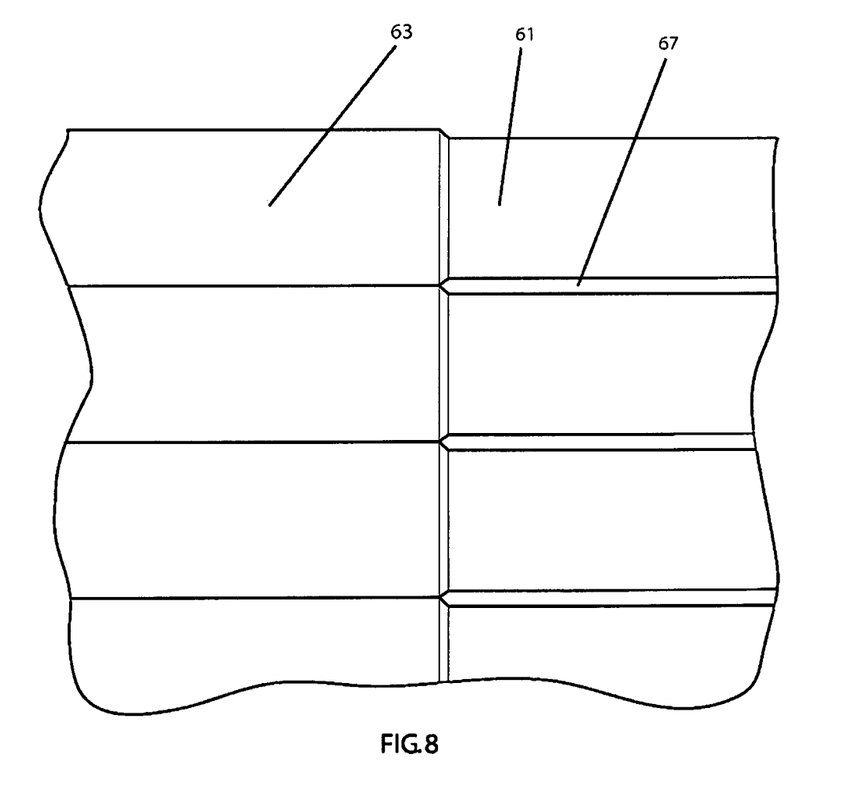
FIG. 8 is partial top view of the arrangement of the teeth of an embodiment of FIG. 1 wherein the teeth have a taper and the apparatus is in the closed position

The use of a taper on the teeth, shown in FIGS. 7 and 8, which is defined as the diameter of the intermediate portion 63 being larger than the diameter of the active portion 61, corrects for potential lateral movement of the series of teeth. This is just one of many ways to address this potential lateral movement.

As shown in FIG. 8, while the apparatus is in a closed position, the intermediate portion 63 of each teeth is in direct contact with the adjacent intermediate portion of the teeth on either side of it belonging to the opposite body member preventing the lateral movement between the two series of teeth 19 and 21 relative to each other and thus maintaining the desired target gap 67 between the teeth.

The diameter of the active portion of the teeth 61 is equal to the diameter of the intermediate portion minus the target gap.

$$\emptyset Ap = \emptyset Ip - G_{ATC}$$

Figure 9:
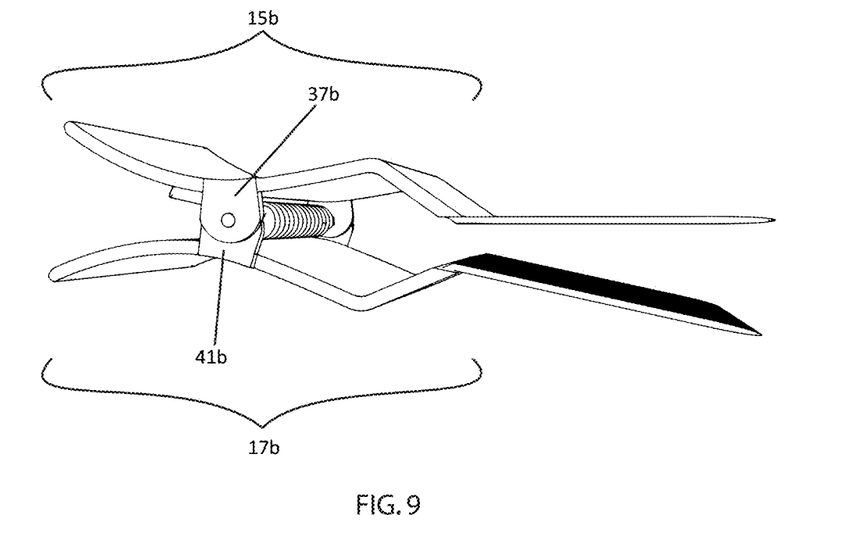
FIG. 9 is another embodiment of the present invention wherein the handles are made of metal and the apparatus is in the open position.

Were,
 ØAp=Diameter of the active portion
 ØIp=Diameter of the inactive portion
 $G_{ATC}$=Target gap between adjacent teeth when the apparatus is in closed position In another embodiment, seen in FIG. 9, wherein the handles 15b and 17b are made of metal, the perforated lugs on the first handle 37b and 39b and the perforated lugs in the second handle 41b and 43b can be made by bending one of the plates used to make the handles 15b and 17b.

Figure 10:
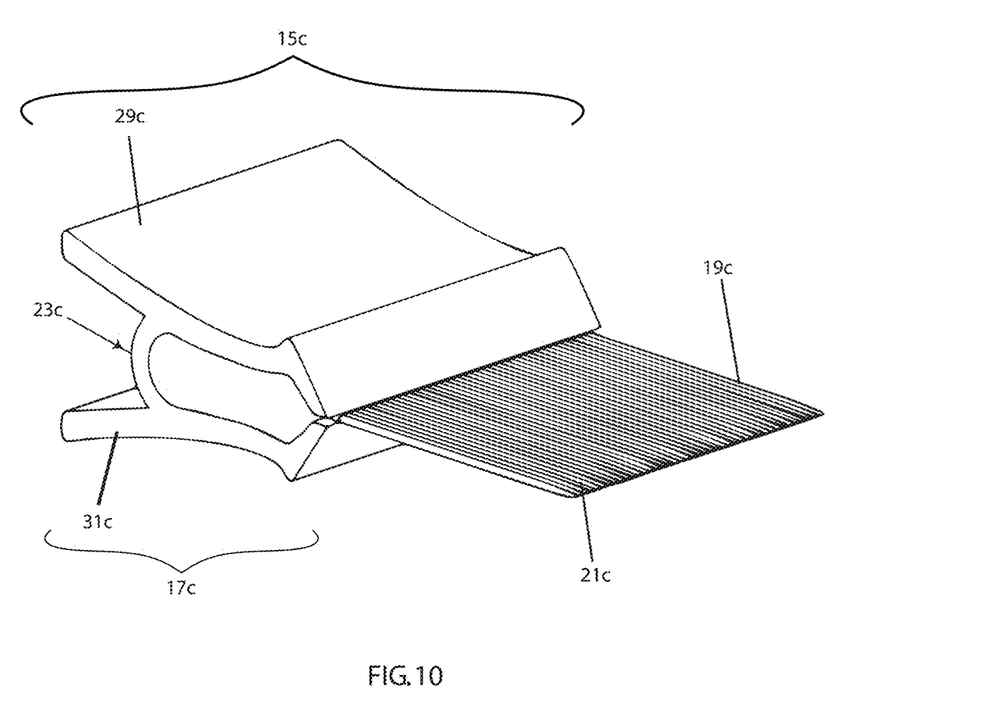
FIG. 10 is another embodiment of the present invention wherein the handles and the hinge means are made in one piece and the apparatus is in the closed position.

FIG. 10 is a further embodiment of the present invention, wherein the apparatus, having the hinge means 23c and handles 15c and 17c made of one-piece polymer, is resting in the teeth closed position when the levers 29c and 31c are not actuated, the two series of teeth 19c and 21c interleave each other allowing the collection of particular matter from a user's hair.

Figure 11:
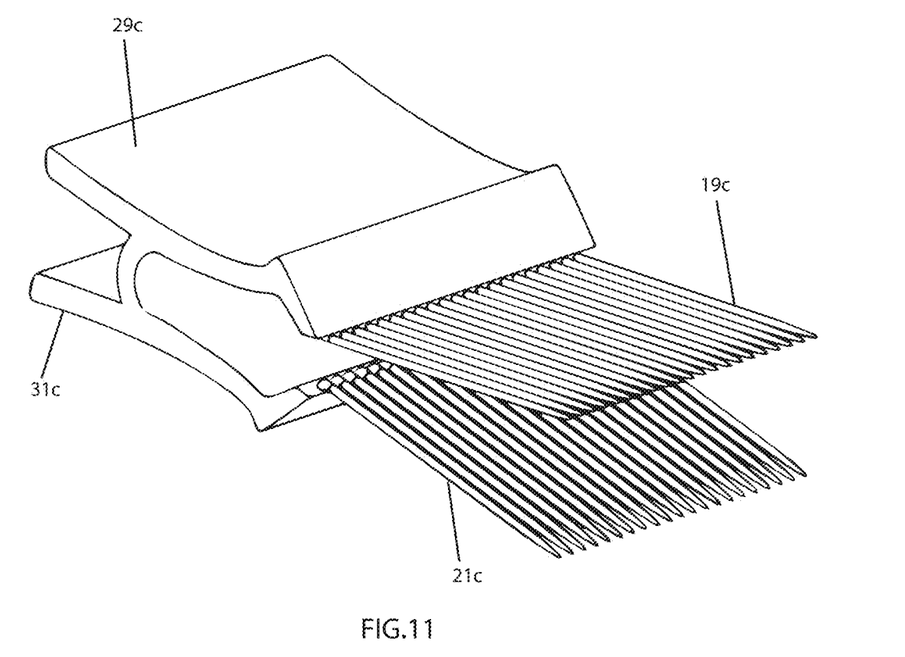
FIG. 11 is an embodiment of FIG. 10 the handles and hinge means are made in one piece and the apparatus is in the open position.

As shown in FIG. 11, when pressure is placed on each lever 29c and 31c, in an upward and downward manner, the apparatus adopts the open teeth position where the series of teeth 19c and 21c are apart from each other, thus being able to discharge any foreign particulate matter collected by the apparatus (when used in hair).

As set forth above in FIG. 4, in open position the spacing between the teeth in one of the series becomes apparent. The creation of the space between the teeth allows the apparatus to be cleaned easily without significant handling.

Figure 12:
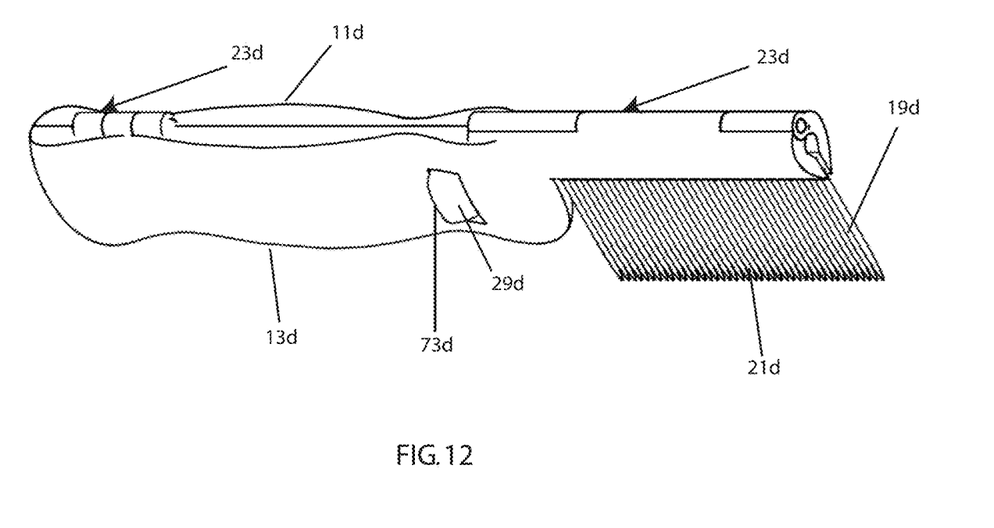
FIG. 12 is another embodiment of the present invention wherein the apparatus has two elongated handles and is in the closed position.
Figure 13:
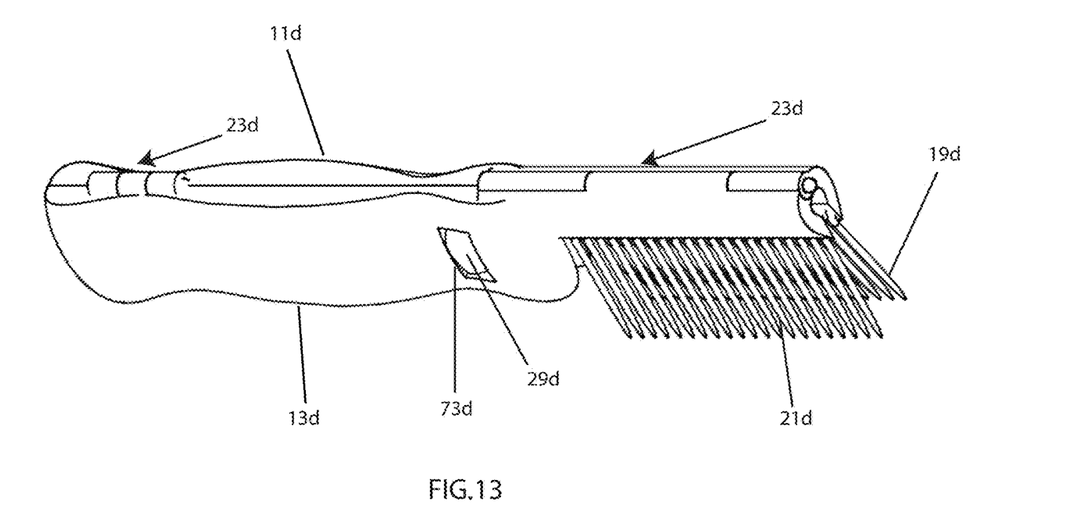
FIG. 13 is an embodiment of FIG. 12 wherein the apparatus has elongated handles and is in the open position.
Figure 14:
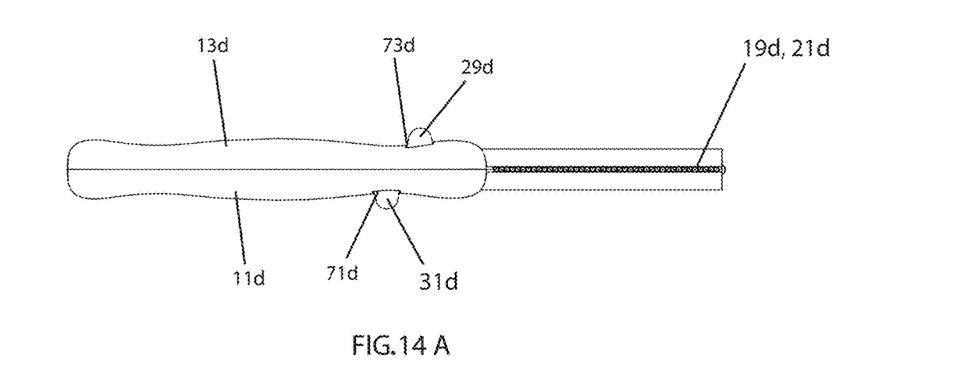
FIG. 14A is a front view of an embodiment of FIG. 11 wherein the apparatus is in the closed position.
FIG. 14B is a front view of an embodiment of FIG. 11 wherein the apparatus is in the open position.

In another embodiment of the present invention, shown in FIGS. 12 through 14, wherein the embodiment has two elongated body members 11d and 13d and said body members 11d and 13d are connected and pivotally coupled together via a hinge means 23d that allows them to pivot to either an open or a closed position. On each elongated body member 11d and 13d, there is an opening 71d and 73d and an actuation lever 29d and 31d. By pressing said levers 29d and 31d against each other the series of teeth 19d and 21d rotate from one another as shown in FIGS. 13 and 14B. As set forth above, in closed position as shown in the FIGS. 12 and 14A, the two series of teeth interleave each other allowing the collection of particular matter from a user's hair.

Figure 15:
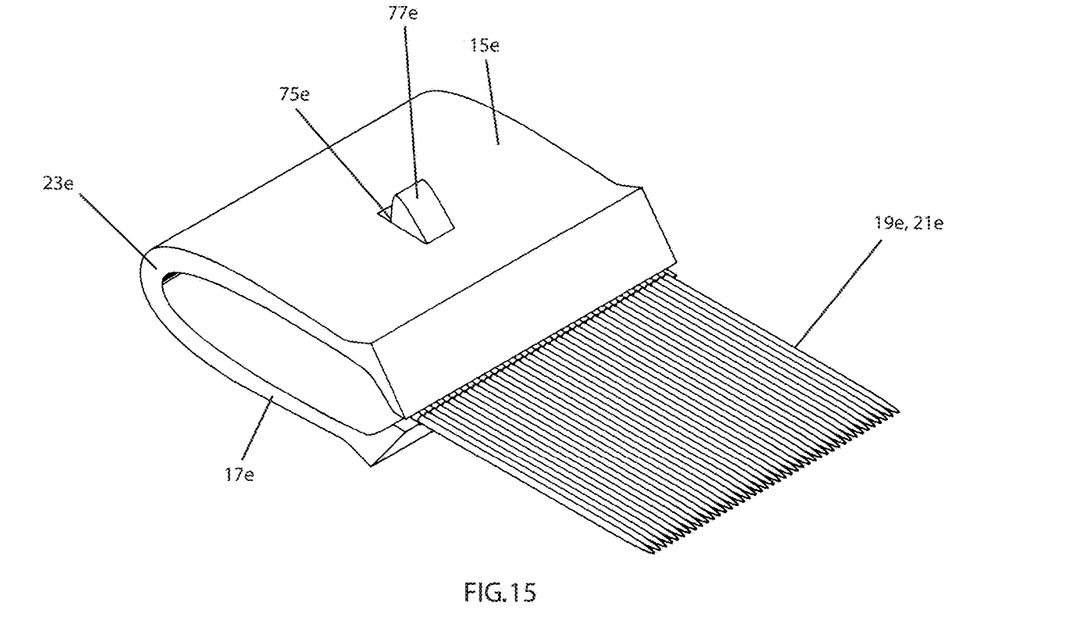
FIG. 15 is another embodiment of the present invention wherein the apparatus is in the closed position.
Figure 16:
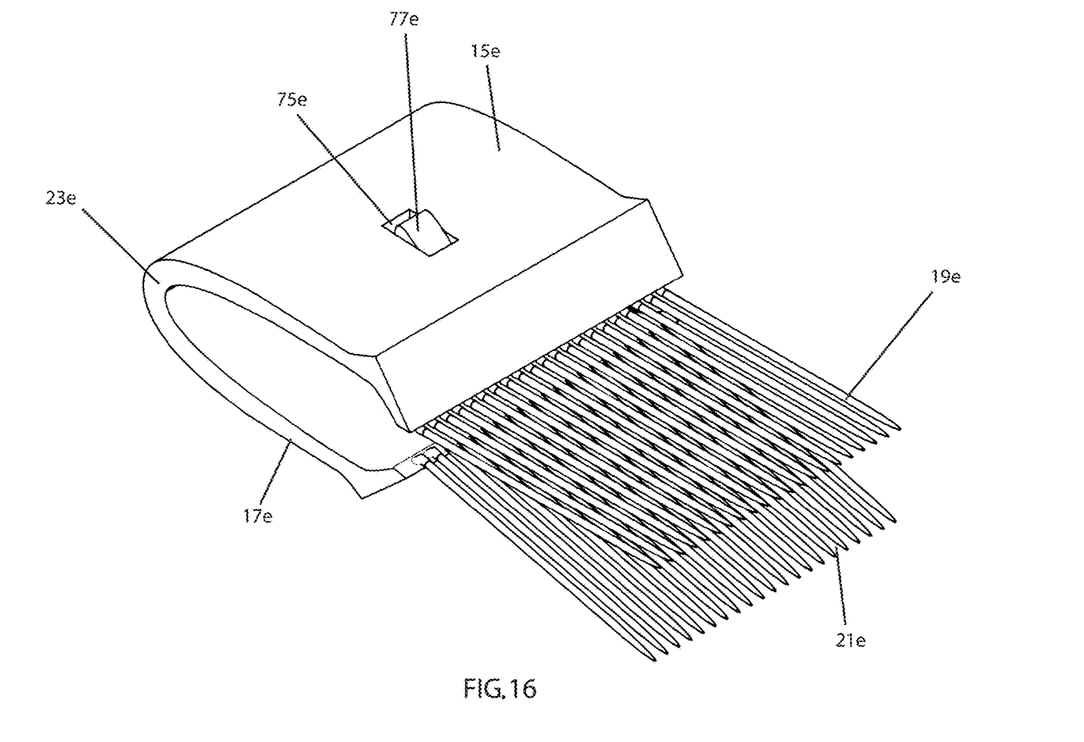
FIG. 16 is another embodiment of FIG. 15 wherein the apparatus is in the open position.
Figure 17:
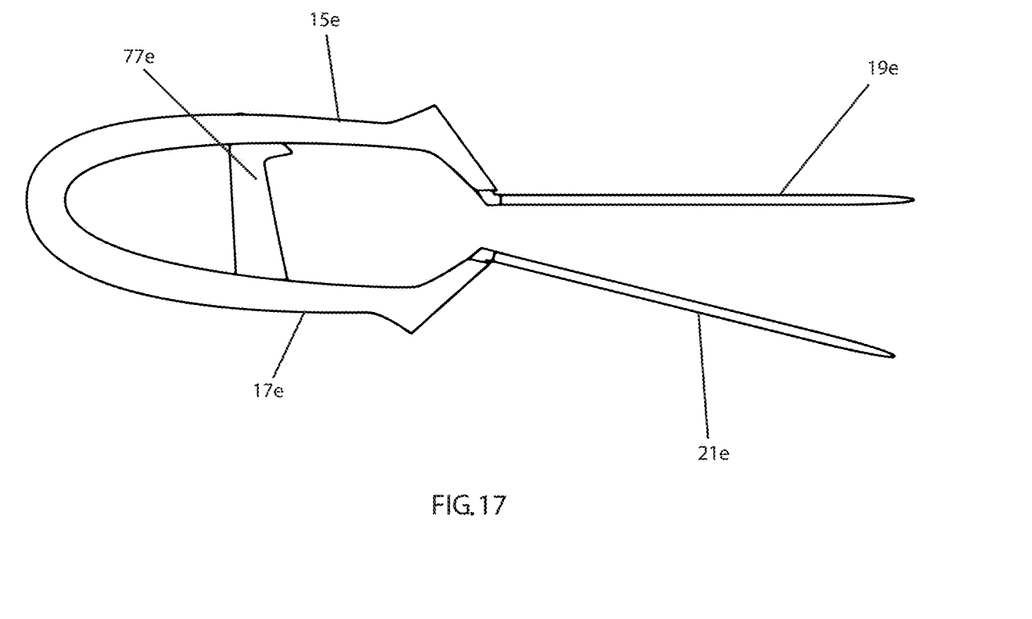
FIG. 17 is a side view of an embodiment of FIG. 15 wherein the apparatus is in the open position

In another embodiment of the present invention shown in FIGS. 15 through 17, wherein the apparatus, having the hinge means 23e and handles 15e and 17e made of one-piece polymer, is molded to rest in the teeth open position as shown in FIGS. 16 and 17. The apparatus is held in the closed teeth position, shown in FIG. 15, by a latch formed by an integral extending latch member 77e in the form of a hook projecting from the bottom handle 17e which goes through an opening 75e on the top handle 15e. The hook 77e hooks over a latching edge on the opening 75e which is on the inward side of the opening. By releasing the hook from the latching edge, the apparatus assumes its resting open teeth position.

Figure 18:
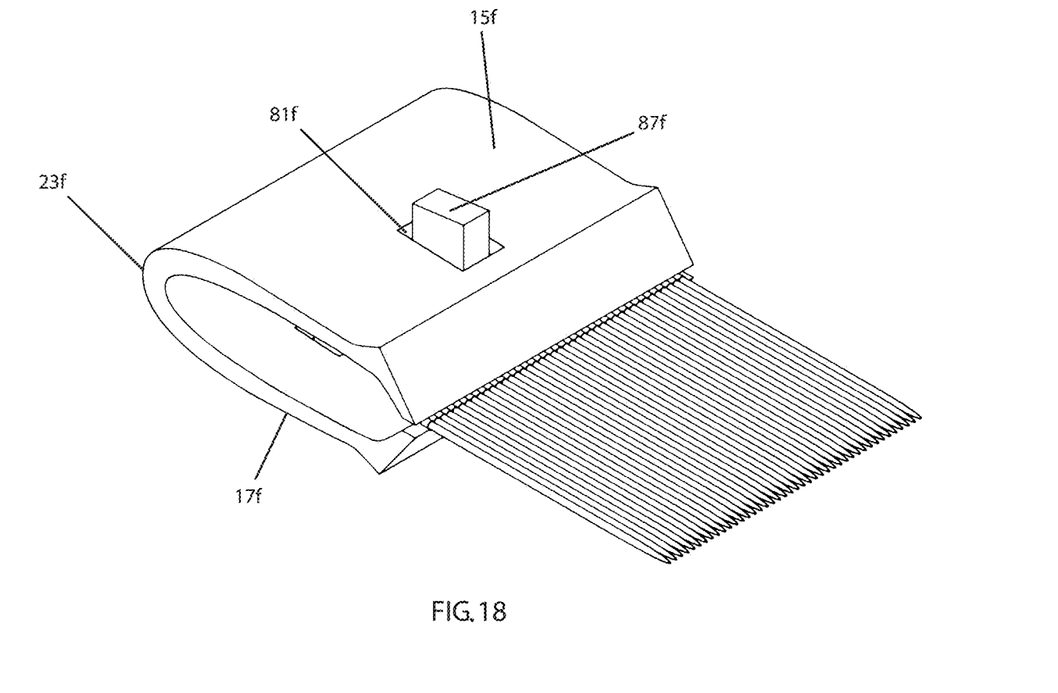
FIG. 18 is another embodiment of the present invention wherein the apparatus is in the closed position.
Figure 19:
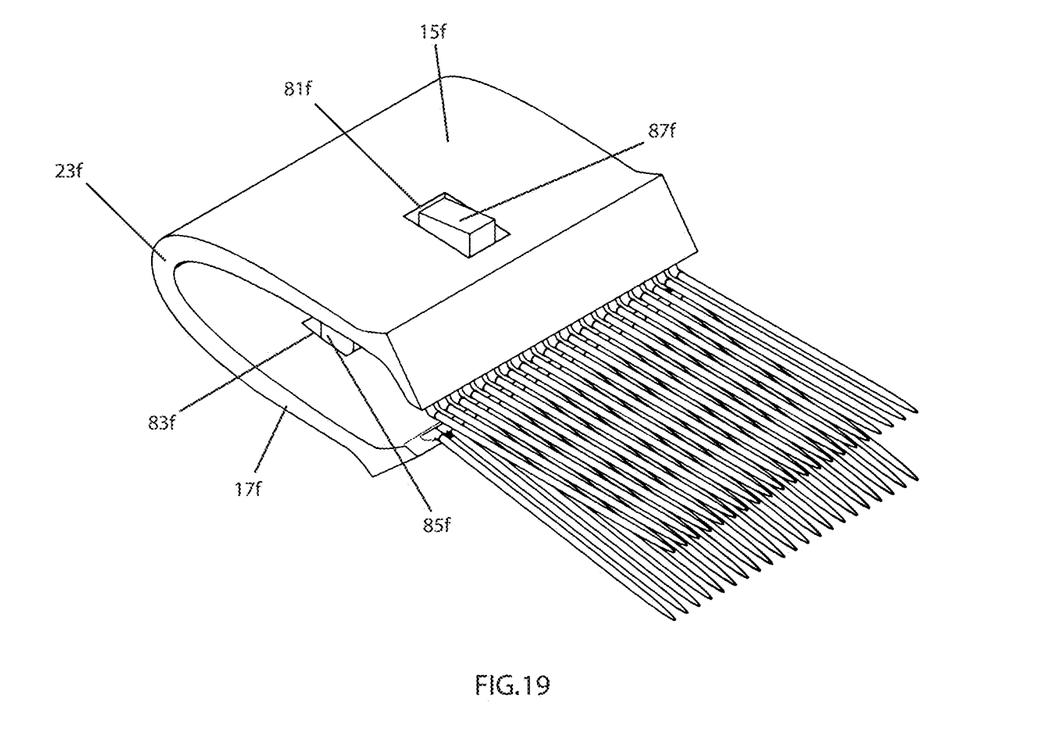
FIG. 19 is another embodiment of FIG. 18 wherein the apparatus is in the open position.
Figure 20:
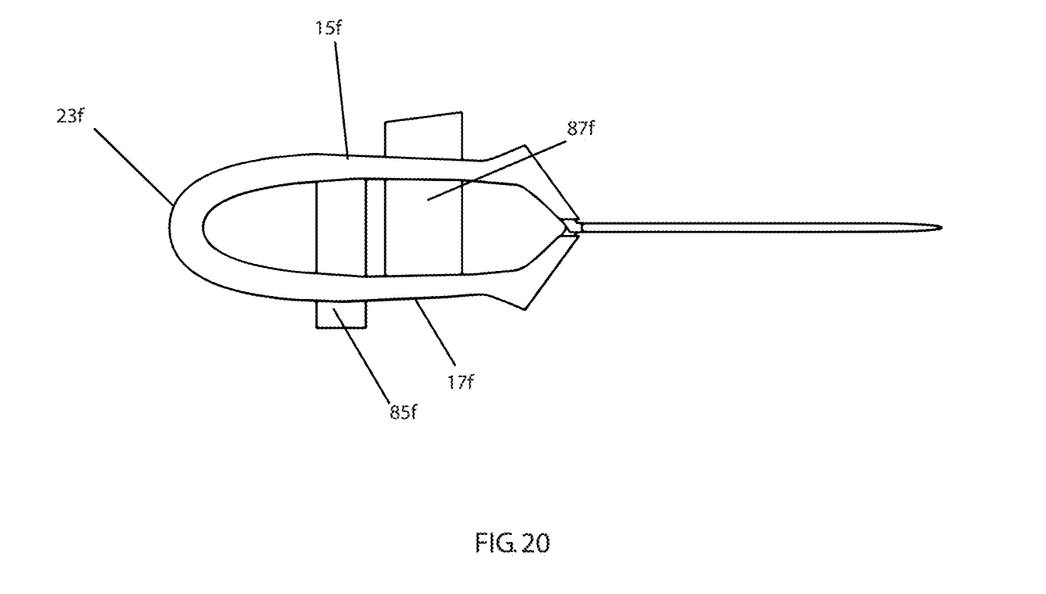
FIG. 20 is a side view of another embodiment of FIG. 18 wherein the apparatus is in the closed position.
Figure 21:
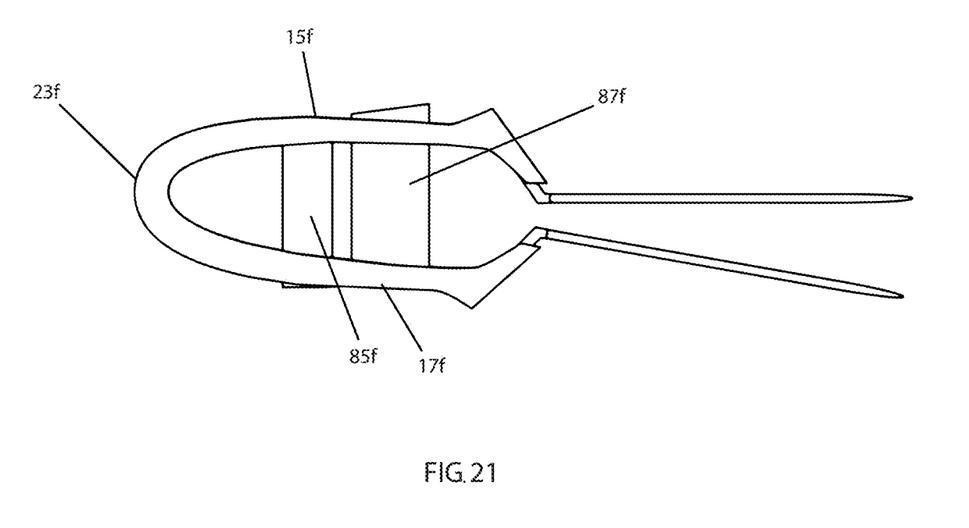
FIG. 21 is a side view of another embodiment of FIG. 18 wherein the apparatus is in the open position.

In yet another embodiment of the present invention shown in FIGS. 18 through 21, wherein the apparatus, having the hinge means 23f and handles 15f and 17f made of one-piece polymer, is molded to rest in the teeth closed position as shown in FIGS. 18 and 20. The top handle 15f has an opening 81f and an integral extending lever member 85f in the form of a member projecting from the top handle 15f wherein said member goes through an opening 83f on the bottom handle 17f. The bottom handle 17f has an opening 83f and an integral extending lever member 87f in the form of a member projecting from the bottom handle 17f wherein said member goes through an opening 81f on the top handle 15f. By pressing said levers 85f and 87f against each other the two body members rotate from one another as shown in FIGS. 19 and 21 adopting the open teeth position that facilitates the cleaning of the apparatus.

We claim:

1. A device for extracting lice or nits from hair or scalp, the device comprising:
   a first body member having a first handle and a first series of parallel teeth, the first series of parallel teeth including an active portion projecting away from the first handle in a direction that defines a first plane,
   a second body member having a second handle and a second series of parallel teeth, the second series of parallel teeth including an active portion projecting away from the second handle in a direction that defines a second plane, and
   a hinge pivotally coupling the first body member and the second body member,
   wherein in a closed position, the first series of teeth and the second series of teeth are interleaved and the first plane and second plane are coplanar so that the active portion of the first series of teeth and the active portion of the second series of teeth project in the same direction and form a comb, wherein a gap between adjacent teeth in the closed position is from 0.05 mm to 0.15 mm so that the device can be used to capture lice or nits when the device in the closed position is used to comb hair or scalp, and wherein in an open position, the first series of teeth and the second series of teeth are rotated apart so that captured lice or nits can be released.

2. A device according to claim 1 wherein the first series of teeth further includes a fastening portion affixed to the first handle and an intermediate portion between the active portion and the fastening portion.

3. A device according to claim 2 wherein the second series of teeth further includes a fastening portion affixed to the second handle and an intermediate portion between the active portion and the fastening portion.

4. A device according to claim 1 wherein the active portion of the first series of teeth has a length of from about 20 mm to about 60 mm.

5. A device according to claim 1 wherein the device is biased into the open or the closed position.

6. A device according to claim 1 wherein the device is biased into the closed position or the open position by a spring.

7. A device according to claim 6 wherein the spring is a torsion spring.

8. A device according to claim 1 further including a latch to secure the device in the closed position.

9. A device according to claim 1 wherein the entire active portion of the first series of parallel teeth lies in the first plane and wherein the entire active portion of the second series of parallel teeth lies in the second plane.

10. A method of using the device of claim 1, the method comprising:
   in the closed position, using the comb to capture lice or nits from hair or scalp,
   rotating the first series of teeth away from the second series, and
   removing captured lice or nits from the first series or teeth or the second series of teeth.

11. A device for extracting lice or nits from hair or scalp, the device comprising:
   a first body member having a first handle and a first series of parallel teeth, the first series of parallel teeth including an active portion projecting away from the first handle in a direction that defines a first plane, wherein all of the teeth projecting from the first handle lie in the first plane,
   a second body member having a second handle and a second series of parallel teeth, the second series of parallel teeth including an active portion projecting away from the second handle in a direction that defines a second plane, wherein all of the teeth projecting from the second handle lie in the second plane, and
   a hinge pivotally coupling the first body member and the second body member,
   wherein in a closed position, the first series of teeth and the second series of teeth are interleaved and the first plane and second plane are coplanar so that the active portion of the first series of teeth and the active portion of the second series of teeth project in the same direction and form a comb, wherein a gap between adjacent teeth in the closed position is sized so as to capture lice or nits when the device is used to comb hair or scalp, and wherein in an open position, the first series of teeth and the second series of teeth are rotated apart so that captured lice or nits can be released.

12. A device according to claim 11 wherein the hinge pivotally couples the first body member and the second body member about a hinge axis and wherein the hinge axis lies in the same plane as the first series of teeth and the second series of teeth when in the closed position.

13. A device according to claim 11 wherein in the closed position, end portions of the first series of teeth and the second series of teeth form a straight row.

14. A device according to claim 13 wherein in the closed position the first series of teeth has an active portion and the second series of teeth has an active portion and wherein the first series of teeth active portion and the second series of teeth active portion define a plane that also contains the straight row.

15. A device according to claim 11 wherein the gap between adjacent teeth in the closed position is from 0.05 mm to 0.15 mm.

16. A method of using the device of claim 11, the method comprising:
   in the closed position, using the comb to capture lice or nits from hair or scalp,
   rotating the first series of teeth away from the second series, and
   removing captured lice or nits from the first series or teeth or the second series of teeth.

17. A device for extracting lice or nits from hair or scalp, the device comprising:
   a first body member having a first handle and a first series of parallel teeth, the first series of parallel teeth including an active portion projecting away from the first handle in a direction that defines a first plane,
   a second body member having a second handle and a second series of parallel teeth, the second series of parallel teeth including an active portion projecting away from the second handle in a direction that defines a second plane, and
   a hinge pivotally coupling the first body member and the second body member, the hinge pivoting about a hinge axis,
   wherein in a closed position, the first series of teeth and the second series of teeth are interleaved and the first plane and second plane are coplanar so that the active portion of the first series of teeth and the active portion of the second series of teeth project in the same direction and form a comb, wherein in the closed position the hinge axis lies in the coplanar first plane and second plane, wherein a gap between adjacent teeth in the closed position is sized so as to capture lice or nits when the device is used to comb hair or scalp, and wherein in an open position, the first series of teeth and the second series of teeth are rotated apart so that captured lice or nits can be released.

18. A device according to claim 17 wherein the first series of teeth further includes a fastening portion affixed to the first handle, an active portion, and an intermediate portion between the active portion and the fastening portion, and wherein the second series of teeth further includes a fastening portion affixed to the second handle, an active portion, and an intermediate portion between the active portion and the fastening portion, wherein the intermediate portion of the first series of teeth has a bend and the intermediate portion of the second series of teeth has a bend, and wherein the bends allow for complete separation of the first series of teeth and the second series of teeth.

19. A device according to claim 17 wherein in the closed position the first series of teeth has an active portion and the second series of teeth has an active portion and wherein the first series of teeth active portion and the second series of teeth active portion define a plane that also contains the hinge axis and the straight row.

20. A device according to claim 17 wherein the gap between adjacent teeth in the closed position is from 0.05 mm to 0.15 mm.

21. A device according to claim 17 wherein the entire active portion of the first series of parallel teeth lies in the first plane and wherein the entire active portion of the second series of parallel teeth lies in the second plane.

22. A method of using the device of claim 17, the method comprising:
   in the closed position, using the comb to capture lice or nits from hair or scalp,
   rotating the first series of teeth away from the second series, and
   removing captured lice or nits from the first series or teeth or the second series of teeth.

* * * * *